(12) United States Patent
Kang

(10) Patent No.: US 6,625,137 B1
(45) Date of Patent: Sep. 23, 2003

(54) METHOD FOR OPERATING SUPPLEMENTAL CODE CHANNEL FOR HIGH SPEED DATA SERVICE IN RADIO TELECOMMUNICATION SYSTEM

(75) Inventor: Mi-Jung Kang, Seoul (KR)

(73) Assignee: Samsung Electronics Co. LTD, Suwon (KR)

(*) Notice: Subject to any disclaimer, the term of this patent is extended or adjusted under 35 U.S.C. 154(b) by 0 days.

(21) Appl. No.: 09/524,348

(22) Filed: Mar. 13, 2000

(30) Foreign Application Priority Data

Mar. 13, 1999 (KR) .......................................... 1999-8441

(51) Int. Cl.[7] .......................... H04Q 7/24; H04B 7/216
(52) U.S. Cl. ....................................... 370/338; 370/320
(58) Field of Search ................................ 370/310, 320, 370/310.1, 338, 328, 342, 335

(56) References Cited

U.S. PATENT DOCUMENTS

| 5,987,326 A | * 11/1999 | Tiedemann, Jr. et al. ... 455/442 |
| 6,144,651 A | * 11/2000 | Rinchiuso et al. .......... 370/335 |
| 6,298,051 B1 | * 10/2001 | Odenwalder et al. ....... 370/342 |

* cited by examiner

Primary Examiner—Wellington Chin
Assistant Examiner—Brenda Pham
(74) Attorney, Agent, or Firm—Cha & Reiter

(57) ABSTRACT

A method for operating the supplemental code channels (SCC) for a high-speed data service in a radio telecommunication system, which includes the steps of connecting a call between a mobile station and a base station; sending, by the mobile station, the number (NUM_SUPMS) and the hold duration (REV_DUR) of the supplemental code channels (SCC) to a base station controller through the base station to request the assignment of the supplemental code channels; upon the receipt of the request, sending the NUM_SUPMS to an SCC assignment processor (SCAP) of the base station by the base station controller to request the assignment of the supplemental code channels; upon the receipt of the request, assigning the supplemental code channels for communication with the mobile station by the SCAP and reporting the channel allocation result (ASS_SUP) to the base station controller; determining, in the base station controller, the number (NUM SUP) and the hold duration (DUR) of supplemental code channels to be assigned based on the channel assignment result ASS_SUP; reporting, by the base station controller, the determined number NUM_SUP and hold duration DUR of the supplemental code channels to the base station and the mobile station; and operating, in the base station and the mobile station, the supplemental code channels based on the reported number NUM_SUP and hold duration DUR of the supplemental code channels.

27 Claims, 12 Drawing Sheets

US 6,625,137 B1

METHOD FOR OPERATING SUPPLEMENTAL CODE CHANNEL FOR HIGH SPEED DATA SERVICE IN RADIO TELECOMMUNICATION SYSTEM

CLAIM OF PRIORITY

This application makes reference to, incorporates the same herein, and claims all benefits accruing under 35 U.S.C. Section 119 from an application for "Method for Operating Supplemental Code Channel for High-Speed Data Service in Radio Telecommunication System" filed in the Korean Industrial Property Office on Mar. 13, 1999 and there duly assigned Serial No. 99-8441.

BACKGROUND OF THE INVENTION

1. Field of the Invention

The present invention relates generally to a method for providing a data service in a radio telecommunication system, and in particular, to a method for allocating and controlling a plurality of traffic channels between a base station and a mobile station to provide a high-speed data service to the mobile station using the CDMA (Code Division Multiple Access) technique.

2. Description of the Related Art

In order to provide the radio communication service to a greater number of subscribers, a cellular system divides the whole service area into a plurality of cells, each including a base station, and manages a plurality of the base stations using a private communication exchange (PCX).

In the advanced radio telecommunication system, an interworking function system (IWF) is connected to a radio network including the base station and the private communication exchange, and the radio network is connected to a wired network, such as a public switched telephone network (PSTN) and the Internet through the interworking function system, thereby providing the mobile subscriber with the data service, such as facsimile and Internet services.

FIGS. 1 and 2 illustrate the general network structure for providing data service to mobile subscribers in a CDMA system. As illustrated, a mobile subscriber accesses a mobile station (MS) 120 using a terminal end (TE) 110 such as a notebook computer, and the mobile station 120 is connected to a radio network including a base station/base station controller (BS/BSC) 130 and a private communication exchange (PCX) 140. The interworking function system (IWF) 150 connects the radio network to a wired network, such as a public switched telephone network (PSTN) 160 or Internet 180, to connect the terminal end 110 to a facsimile 170 or a personal computer (PC) 190.

The above network, the terminal end 110 can exchange the data with the facsimile 170 connected to the PSTN 160 and the personal computer 190 connected through Internet 180. Although the data rate is relatively lower compared to the wired data service, it is possible to provide some mobility and service to the terminal end 110.

The CDMA radio network, which separates one frequency channel into a plurality of code channels using codes, can support the greater number of subscribers compared to the frequency division multiple access (FDMA) radio network.

FIG. 3 shows the general structure of a reverse code channel (for transmitting signals from the mobile station to the base station) for a CDMA radio telecommunication system. As illustrated, the reverse channel 210 having a bandwidth of 1.23 MHz includes a plurality of access channels 211–214 each corresponding to one paging channel and a plurality of traffic channels 215–216 for transmitting the voice and the data information.

FIG. 4 shows the general structure of a forward code channel (for transmitting signals from the base station to the mobile station) for the CDMA radio telecommunication system. As illustrated, the forward channel 220 having a bandwidth of 1.23 MHz includes a pilot channel 221 for transmitting the unique base station signal, a sync channel 222 for transmitting a system time of the base station, a plurality of paging channels 223–224 each corresponding to one access channel, and a plurality of traffic code channels 225–229 for transmitting voice and data information. The forward traffic code channels 225–229 each transmit the traffic data 230, such as voice and data, and power control data 231, for controlling the power of the mobile station.

The TIA/EIA/IS-95 CDMA radio network only supports the data rate of 8.6 Kbps (Rate Set 1) or 13.35 Kbps (Rate Set 2) for each code channel. However, in order to provide the mobile subscriber with the data service as well as the voice service, the data rate has to be increased. In addition, as the data rate of the radio link is not stably guaranteed due to variation in the radio environment of the ratio link, the actual data rate may be lower than the specified data rate.

In the CDMA system, the base station and the mobile station exchange the call data (i.e., voice) using only one code channel (or traffic channel). However, it is not possible to transmit the greater amount of data efficiently and rapidly through one code channel that only has the data rate of 8.6 Kbps or 13.35 Kbps.

In summary, in the conventional data service system the base station and the mobile station exchange the data using only one code channel, which has a limited data rate, making it difficult to provide a high-speed data service.

SUMMARY OF THE INVENTION

It is, therefore, an object of the present invention to provide a method for allocating a plurality of code channels for the radio link between a base station and a mobile station to provide a high-speed data service.

It is another object of the present invention for controlling the code channels allocated for the radio link between a base station and a mobile station.

In accordance with the first aspect of the present invention, a method for operating supplemental code channels for a high-speed data service in a radio telecommunication system, comprising the steps of connecting a call between a mobile station and a base station; sending, by the mobile station, a number (NUM_SUPMS) and a hold duration (REV_DUR) of the supplemental code channels (SCC) to a base station controller through the base station to request the assignment of the supplemental code channels; upon the receipt of the request, sending, by the base station controller, the NUM_SUPMS to an SCC assignment processor (SCAP) of the base station to request the assignment of the supplemental code channels; upon the receipt of the request, assigning, by the SCAP, the supplemental code channels for the communication with the mobile station, and reporting the channel allocation result (ASS_SUP) to the base station controller; determining, by the base station controller, a number (NUM_SUP) and a hold duration (DUR) of the supplemental code channels to be assigned based on the channel assignment result (ASS_SUP); reporting, by the base station controller, the determined number (NUM_SUP) and the hold duration (DUR) of the supplemental code channels to the base station and the mobile station; and, operating, by the base station and the mobile station, the supplemental code channels based on the reported number (NUM_SUP) and the hold duration (DUR) of the supplemental code channels.

In accordance with the second aspect of the present invention, a method for operating the supplemental code channels for a high-speed data service in a radio telecommunication system, includes the steps of connecting a call between a mobile station and a base station; sending, by a base station controller for controlling the mobile station, a number (NUM_SUPBS) and a hold duration (FOR_DUR) of the supplemental code channels (SCC) to an SSC assignment processor (SCAP) of the base station to request the assignment of the supplemental code channels; upon receipt of the request, assigning, by the SCAP, the supplemental code channels for communication with the mobile station, and reporting the channel allocation result (ASS_SUP) to the base station controller; determining, by the base station controller, a number (NUM_SUP) and a hold duration (DUR) of the supplemental code channels to be assigned based on the channel assignment result (ASS_SUP); reporting, by the base station controller, the determined number (NUM_SUP) and the hold duration (DUR) of the supplemental code channels to the base station and the mobile station; and, operating, by the base station and the mobile station, the supplemental code channels based on the reported number (NUM_SUP) and the hold duration (DUR) of the supplemental code channels.

In accordance with a third aspect of the present invention, a method for operating the supplemental code channels for a high-speed data service in a radio telecommunication system includes the steps of connecting a call between a mobile station and a first base station, and operating a plurality of supplemental code channels; adding a second base station for a hand off to a radio link between the mobile station and the first base station; sending, by a base station controller controlling the first and the second base stations, a number (NUM_SUP1) and a hold duration (DUR1) of the supplemental code channels (SCC) to an SSC assignment processor (SCAP2) of the second base station to request the assignment of the supplemental code channels; upon receipt of the request, assigning, by the SCAP2, the supplemental code channels for the communication with the mobile station, and reporting the channel allocation result (ASS_SUP) to the base station controller; determining, by the base station controller, a number (NUM_SUP) and a hold duration (DUR) of the supplemental code channels to be assigned based on the channel assignment result (ASS_SUP); reporting, by the base station controller, the determined number (NUM_SUP) and the hold duration (DUR) of the supplemental code channels to the first base station, the second base stations, and the mobile station; and, allocating the supplemental code channels to the mobile station, the first base station, and the second base stations based on the reported number (NUM_SUP) and the hold duration (DUR) of the supplemental code channels.

In accordance with the fourth aspect of the present invention, a method for operating the supplemental code channels for a high-speed data service in a radio telecommunication system, comprising the steps of connecting a call between a mobile station and the first and the second base stations; requesting the assignment of the supplemental code channels (SCC) by the mobile station or a base station controller coupled to control the first and the second base stations; sending, by the base station controller, a number (NUM_SUP0) and a hold duration (DUR0) of the supplemental code channels to an SSC assignment processors of the first and the second base stations (SCAP1 and SCAP2), respectively, for assigning the supplemental code channels; upon receipt of the request, assigning, by the SCAP1 and the SCAP2, the respective supplemental code channels for the communication with the mobile station, and reporting the respective channel allocation results (ASS_SUP1 and ASS_SUP2) to the base station controller; determining, by the base station controller, a number (NUM_SUP) and a hold duration (DUR) of the supplemental code channels to be assigned depending on the channel assignment results ASS_SUP1 and ASS_SUP2; reporting, by the base station controller, the determined number NUM_SUP and the hold duration DUR of the supplemental code channels to the first base station, the second base station, and the mobile station; and, operating the number of supplemental code channels based on the reported number (NUM_SUP) and the hold duration (DUR) of the supplemental code channels among the first base station, the second base station, and the mobile station.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

The preferred embodiment of the present invention will be described hereinbelow with reference to the accompanying drawings. For the purpose of clarity, well-known functions or constructions are not described in detail as they would obscure the invention in unnecessary detail.

Figure 1:
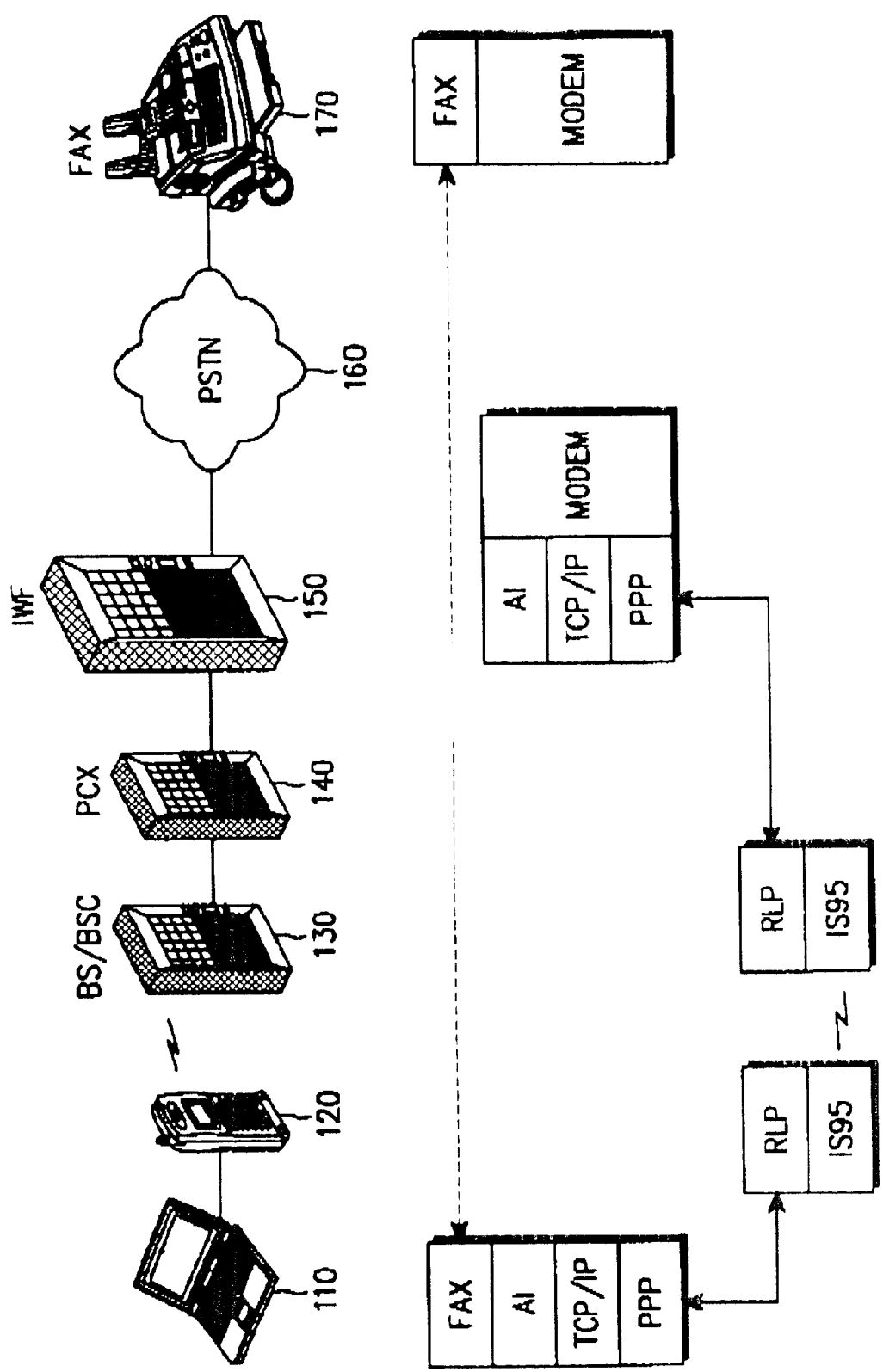
FIG. 1 is a diagram illustrating a general network structure for providing a data service in a CDMA system.
Figure 2:
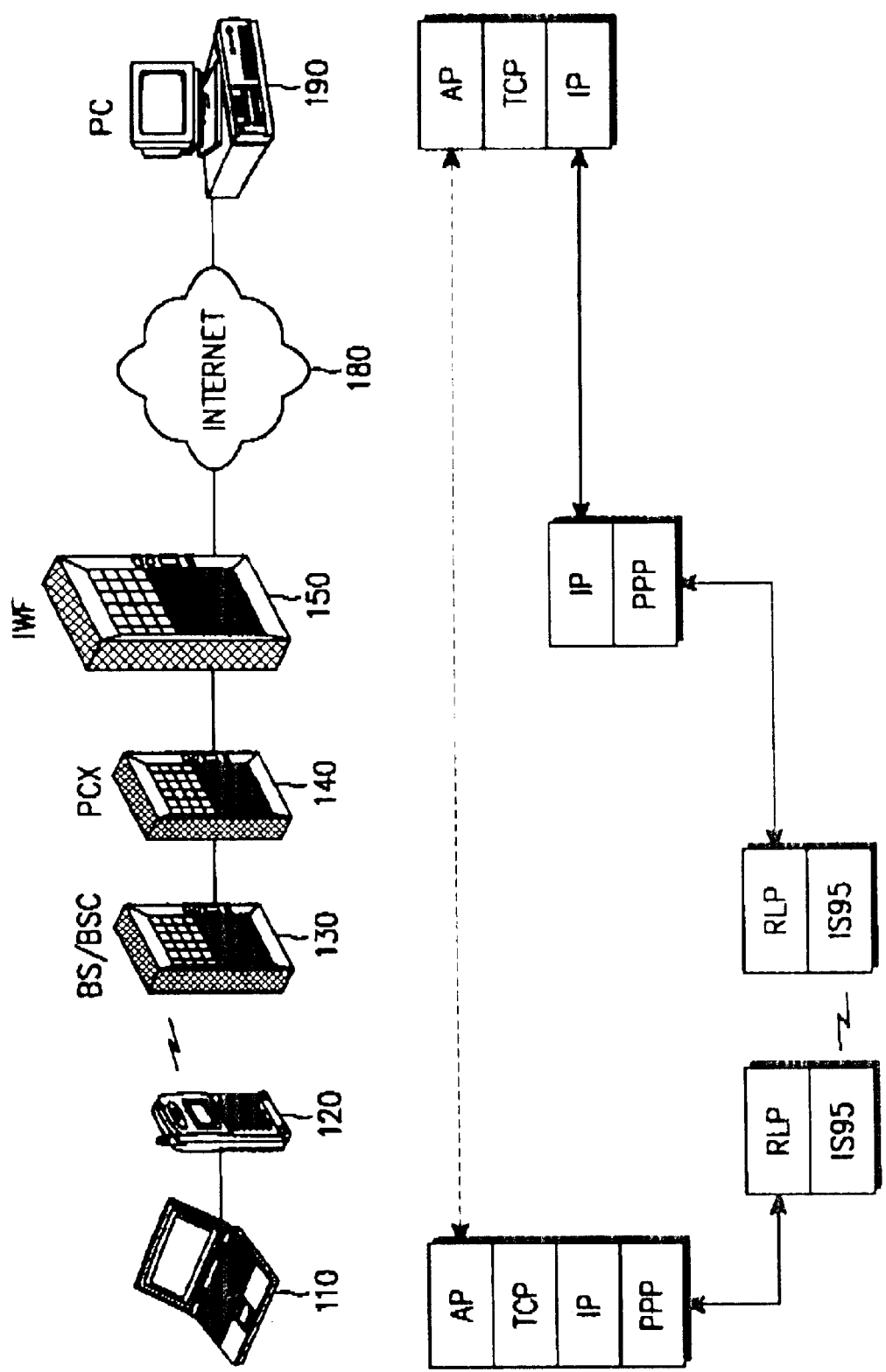
FIG. 2 is a diagram illustrating another general network structure for providing a data service in a CDMA system.
Figure 3:
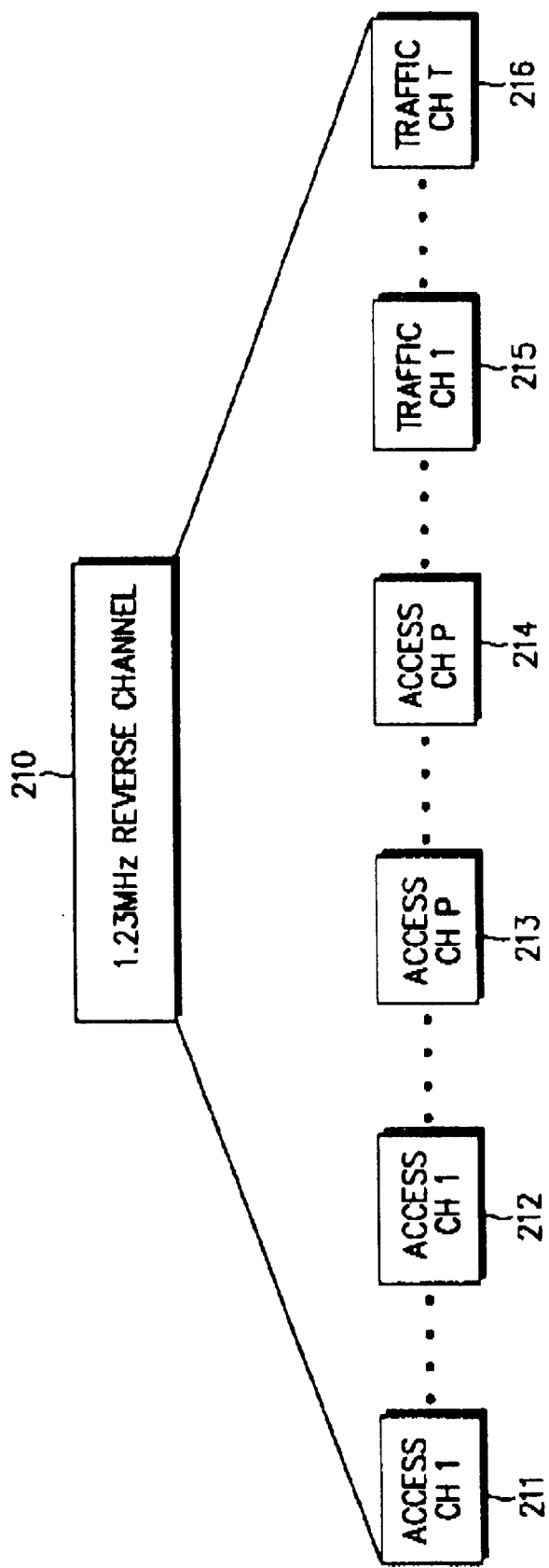
FIG. 3 is a diagram illustrating a general reverse channel structure in a CDMA system.
Figure 4:
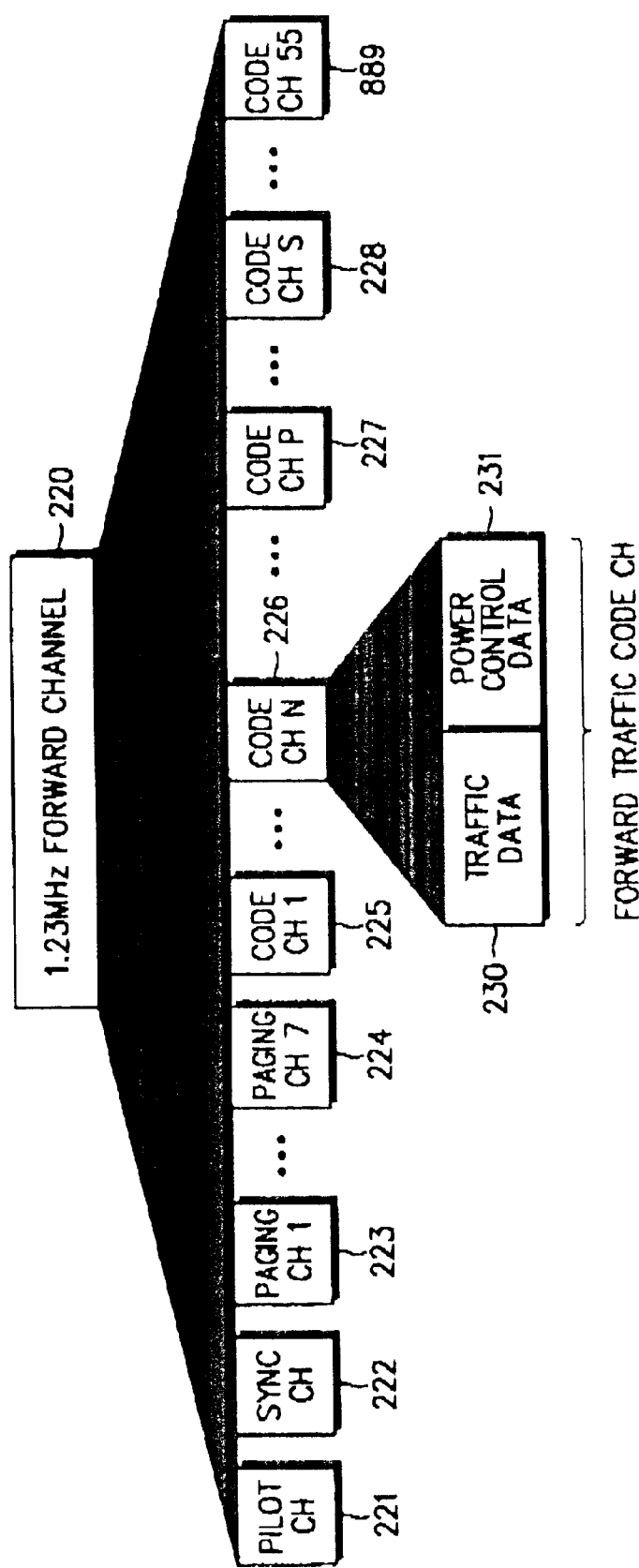
FIG. 4 is a diagram illustrating a general forward channel structure in a CDMA system.

According to the embodiment of the present invention, one fundamental code channel and 8 supplemental code channels are assigned between a base station and a mobile station. That is, in the network structure of FIGS. 1 and 2, a plurality of code channels are assigned between the mobile station 120 and the base station 130 to enable a mobile subscriber to transmit the data information to the facsimile 170 or the personal computer 190 using the mobile station 120. The base station 130 can assign a maximum of 8 supplemental code channels for each call and the assigned supplemental code channels include the unique indexes of 0 to 7. When the 8 code channels are simultaneously assigned to the mobile station 120 connected to the terminal end 110, it is possible to support the data service of 66.4 Kbps (=8.3 Kbps×8) at a Rate Set 1 and 106.80 Kbps (=13.35 Kbps×8) at a Rate Set 2.

Figure 5:
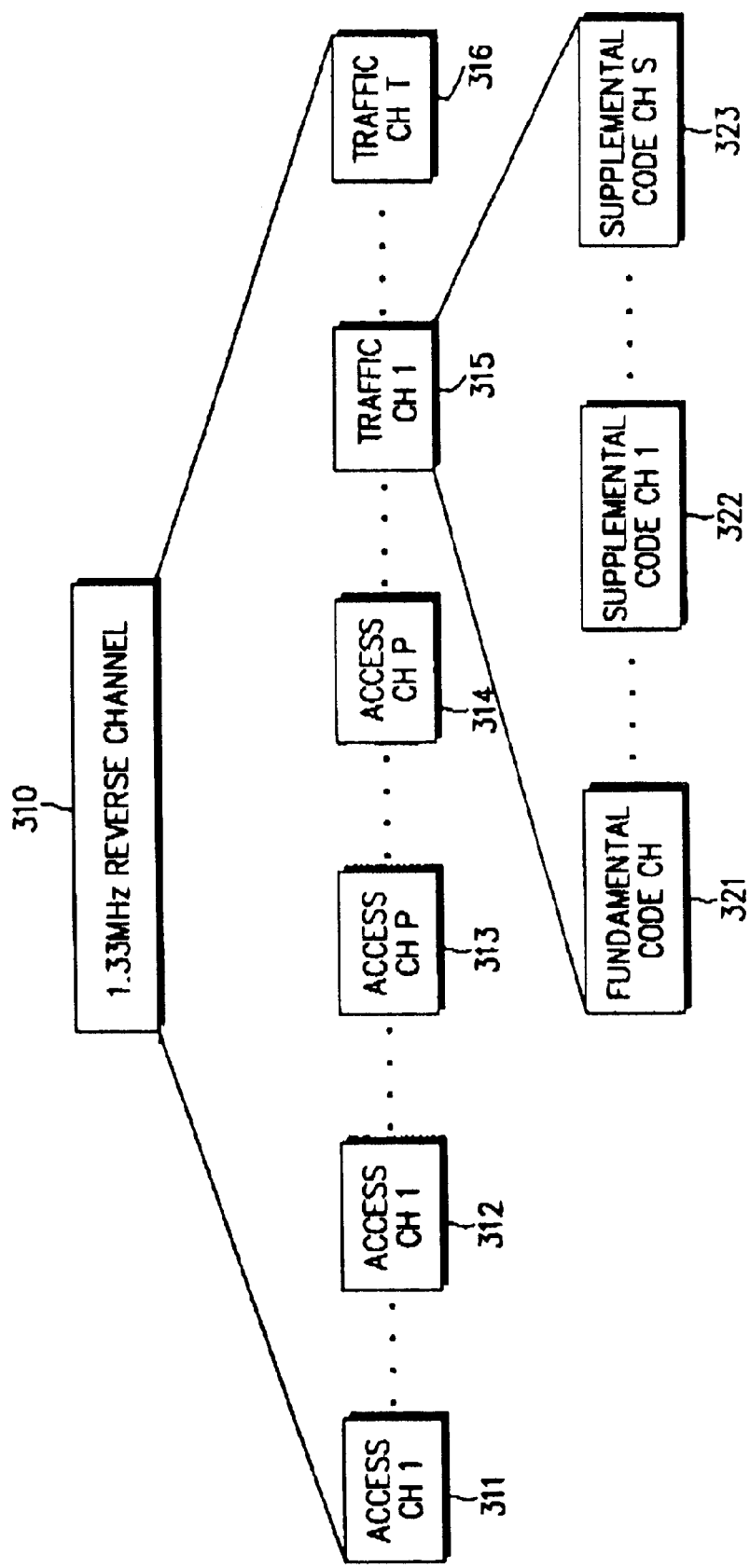
FIG. 5 is a diagram illustrating the reverse channel structure including a plurality of code channels according to the embodiment of the present invention.

FIG. 5 illustrates a reverse channel structure which includes a plurality of code channels according to the embodiment of the present invention. As illustrated, the reverse channel 310 includes a plurality of access channels 311–314 each corresponding to one paging channel and a plurality of traffic channels 315–316 for transmitting voice and data information. The traffic channels 315–316 each includes one fundamental code channel 321 and a plurality of supplemental code channels 322–323.

Figure 6:
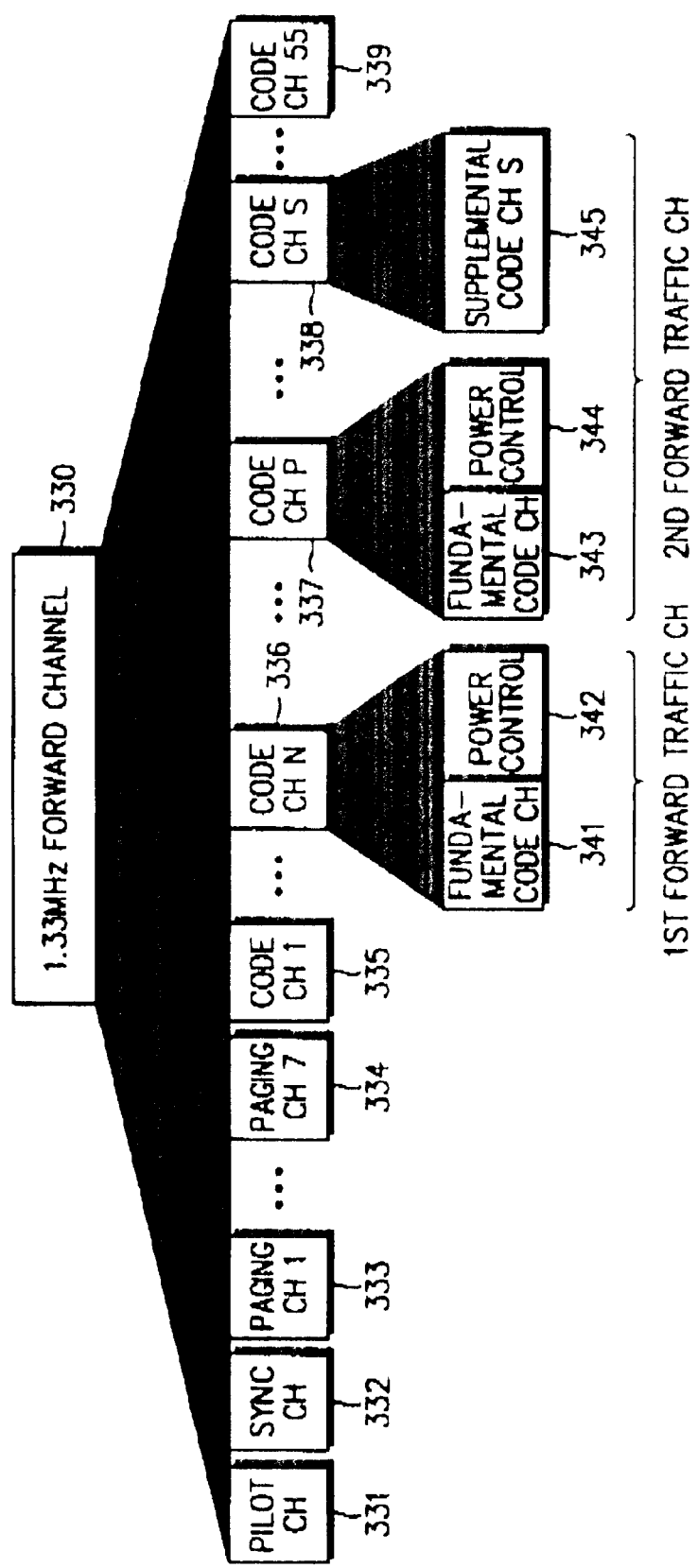
FIG. 6 is a diagram illustrating the forward channel structure including a plurality of code channels according to the embodiment of the present invention.

FIG. 6 shows a forward channel structure which includes a plurality of code channels according to the embodiment of the present invention. As illustrated, the forward channel 330 includes a pilot channel 331 for transmitting the unique base station signal, a sync channel 332 for transmitting the system time of the base station, a plurality of paging channels 333–334 each corresponding to one access channel, a plurality of first forward traffic channels 336 for transmitting the data on the fundamental code channel 341 and the power control data 342, and a plurality of second forward traffic channels 337–339 for transmitting the data on the fundamental code channel 343, the power control data 344, and the supplemental code channel 345.

The first forward traffic channel 336 serves only as a fundamental code channel and the second forward traffic channels 337–339 can serve as either the fundamental code channel or the supplemental code channel. As specified by the IS-95B standard, the fundamental code channels 341 and 343 include the primary data, the secondary data, and the signaling and power control information, and exists always in the traffic channel to perform the fundamental call function. Further, as specified by the IS-95B standard, the supplemental code channel transmits the primary data and the secondary data to provide the high-speed data service, and they are assigned or released according to the quantity of the transmission data. The supplemental code channel is enabled only at the maximum data rate of 106.80 Kbps (Rate Set 2), and the decision of whether to enable the supplemental code channel is determined through the negotiation by a multiplex option. The multiplex option specified by the IS-95B standard is the type of the service option and determines the number of channels to be used and the data rate of the channels. For example, a Multiplex Option 1 uses only the Rate Set 1, a Multiplex Option 2 uses only the Rate Set 2, and a Multiplex Option 3 uses only the Rate Set 1 and assigns one supplemental channel. The IS-95B standard provides 16 multiplex options.

In the reverse channel, the base station separates the code channels (including the fundamental code channels and the supplemental code channels) using the long PN (Pseudo-random Noise) codes. In the forward channel, the mobile station separates the code channels using the Walsh codes. The base station has a supplemental code channel assignment processor (SCAP) for allocating the supplemental code channels and for managing the state of the supplemental code channels. The assignment and the release of the supplemental code channels are performed in a radio link protocol (RLP) layer of FIGS. 1 and 2, and the IS-95 layer performs the actual channel assignment process. When the mobile station or the base station requires the assignment of the supplemental code channels, the base station controller (BSC) requests the SCAP of the corresponding base station to assign a specified number of the supplemental code channels. The SCAP then analyzes the requested supplemental code channel number and the supplemental code channel resources, and then assigns the available supplemental code channels.

Figure 7:
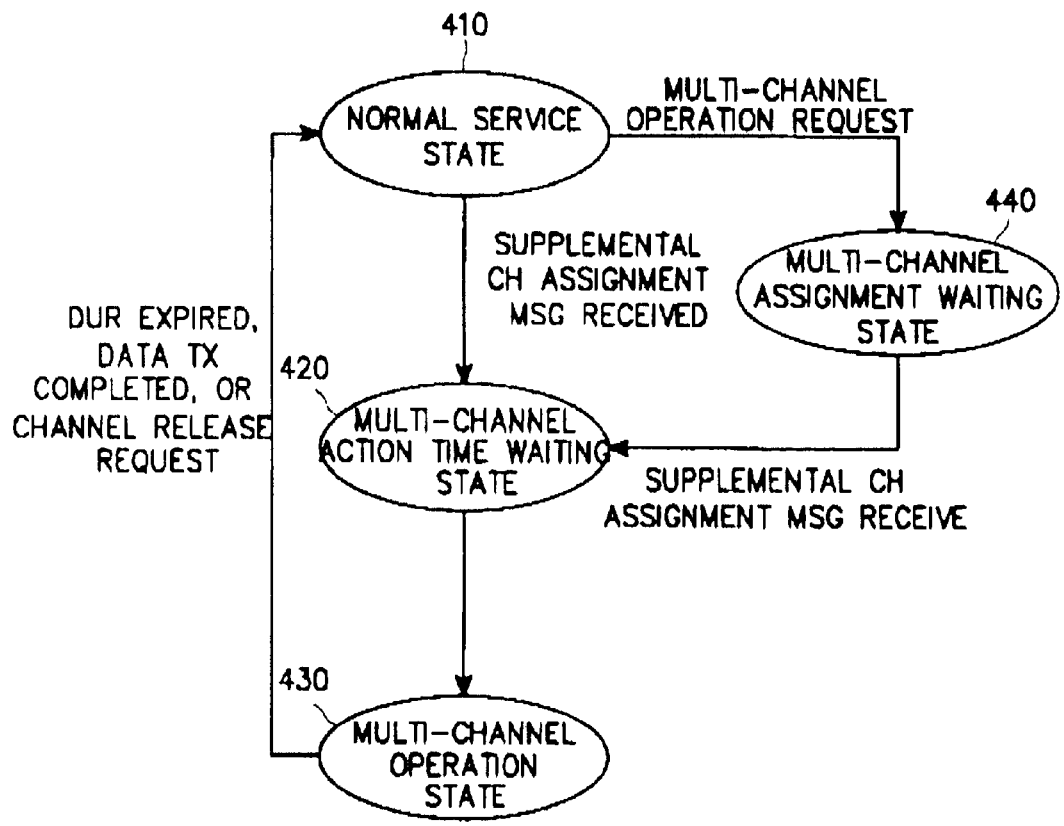
FIG. 7 is a state transition diagram illustrating a multi-channel operation of a mobile station according to the embodiment of the present invention.

The IS-95B standard defines the several operation states to enable the mobile station to process the supplemental code channels. FIG. 7 shows the state transition of the mobile station according to the embodiment of the present invention.

Referring to FIG. 7, upon the receipt of a supplemental channel assignment message from the base station in a normal service state 410, the mobile station transitions to a "multi-channel action time waiting state" 420. After the lapse of a specific action time, the mobile station enters the "multi-channel operation state" 430. In the "multi-channel operation state" 430, the mobile station exchanges the data with the base station over the multi-channel. During the receiving mode, the mobile station receives the data in parallel from the base station on a multiple-to-one channel basis (BS:MS=n:1). During the transmission mode, the mobile station transmits the data in series to the base stations on a one-to-multiple channel basis (MS:BS=1:n). After the expiration of a predetermined hold duration (DUR) of the assigned channels or the completion of data transmission, or upon the receipt of a channel release request, the mobile station transitions back to the normal service state 410 from the multi-channel operation state 430.

In addition, upon the receipt of a multi-channel operation request from the terminal end in the normal service state 410, the mobile station sends a "supplemental channel request message" to the base station and transitions to the "multi-channel assignment waiting state" 440. Upon the receipt of the "supplemental code channel assignment message" from the base station, the mobile station transitions from the "multi-channel assignment waiting state" 440 to the "multi-channel action time waiting state" 420 to prepare for the operation of the multi-channel.

A method for operating the supplemental code channels according to the present invention includes: (1) a first embodiment where the mobile station requests the assignment of supplemental code channels while requesting a call origination; (2) a second embodiment where the base station controller assigns the supplemental code channels after the call setup procedure; (3) a third embodiment where a new base station is added by the handoff after the assignment of the supplemental code channels; and (4) a fourth embodiment where the supplemental code channel assignment request is received either from the base station or the mobile station while the handoff is performed without the supplemental code channels.

When the mobile station exchanges the packet data with the base station and constantly maintains the assigned supplemental code channel regardless of the quantity of the transmission data rate, the unused channels are wasted during the non-transmission mode. Therefore, the mobile station and the base station can limit the hold duration of the supplemental code channels for allowing the efficient use of the resources. That is, after the assignment of the supplemental code channels, if the hold duration determined by the base station controller expires, the base station and the mobile station stop using the supplemental code channels and release all activated supplemental channels. The releasing step involves not only the logical release but also the physical release of the supplemental channels assigned between the mobile station and the base station.

The assignment and the release of the supplemental code channels is performed on a last-in, first-out (LIFO) basis. That is, the base station and the mobile station normally assign the supplemental code channels beginning with the supplemental code channel with the lowest index, otherwise the base station and the mobile station release the supplemental code channels beginning with the supplemental code channel with the highest index.

A. First Embodiment

In the first embodiment of the present invention, the mobile station requests the assignment of the supplemental code channels while requesting call origination.

Figure 8:
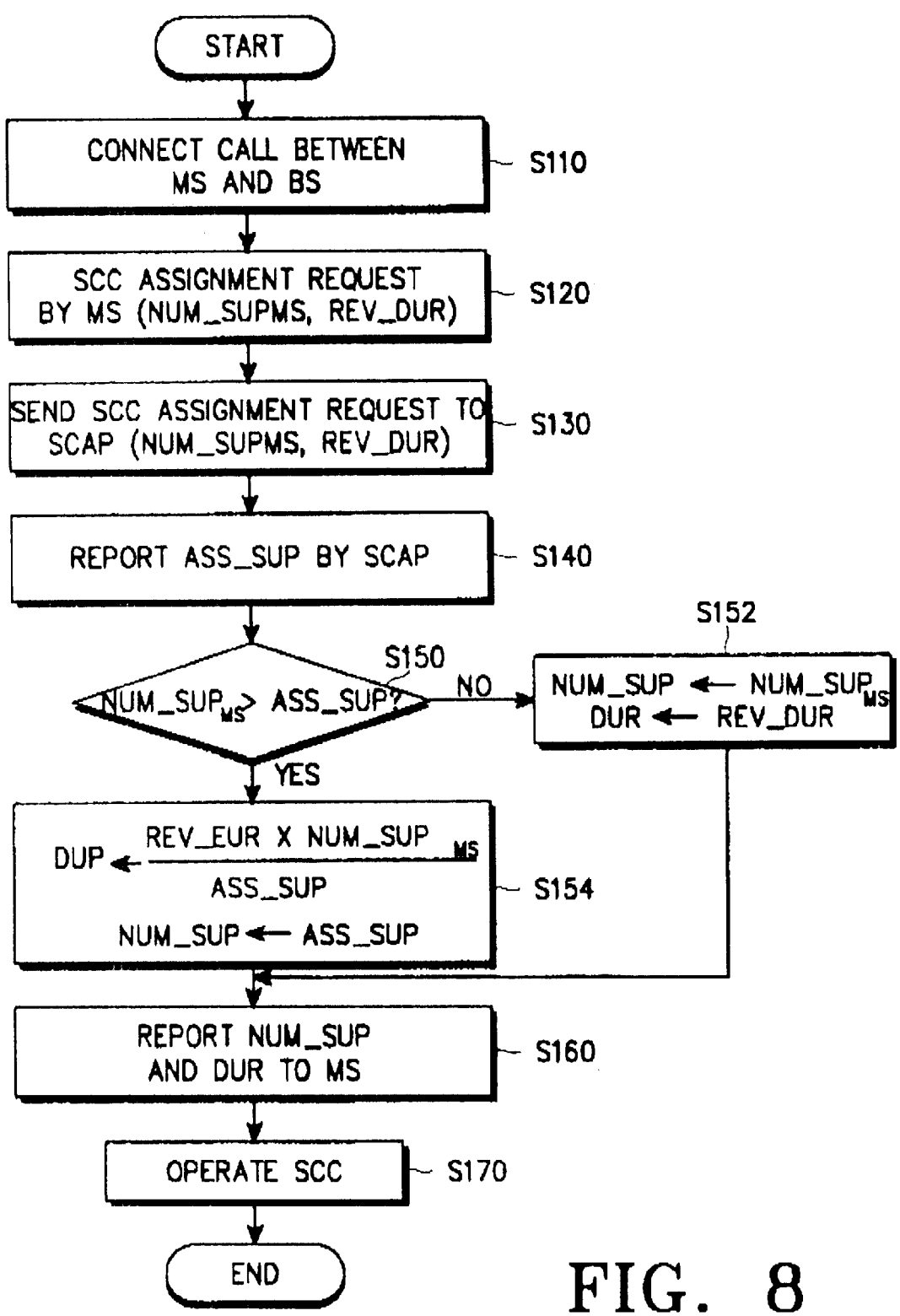
FIG. 8 is a flow chart illustrating a method for operating the supplemental code channels according to the first embodiment of the present invention.

FIG. 8 illustrates a method for operating the supplemental code channels according to the first embodiment of the present invention. As illustrated, the mobile station and the base station establish a call in step s110, and the mobile station sends a "supplemental code channel (SCC) assignment request" to the base station controller through the base station in step s120. The base station controller sends a "supplemental code channel assignment request" to the supplemental code channel assignment processor (SCAP) of the base station to which the SCAP assigns the SCC in step s130, and the SCAP reports the "supplemental code channel assignment results" to the base station controller in step s140. The base station controller determines the number (NUM_SUP) of the supplemental code channels to be assigned and the hold duration of the corresponding supplemental code channels based on the "supplemental code channel assignment results", in steps s150, s152 and s154. The base station controller reports the determined supplemental code channel number and the hold duration to the base station and the mobile station, in step s160. The base station and the mobile station operate the supplemental code channels using the reported supplemental code channel number and the hold duration, in step s170. A detailed description of this procedure will be made in FIG. 9.

Figure 9:
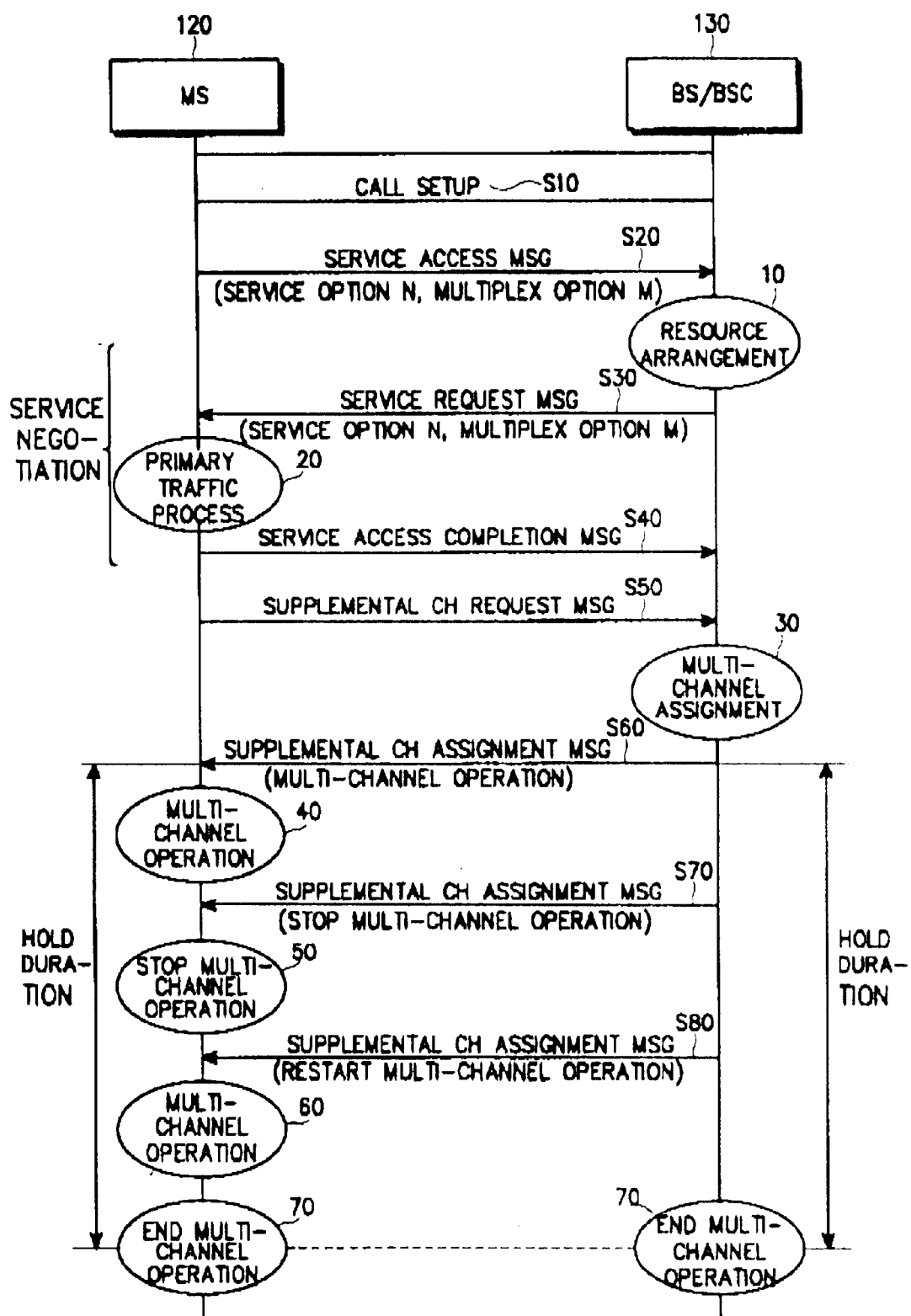
FIG. 9 is a flow chart illustrating the call procedure using a multi-channel according to an embodiment of the present invention.

Referring to FIG. 9, at step s10, the mobile station and the base station connect a call through the call setup process and the service negotiation process. That is, when the user sends a data service request to the mobile station 120 using the terminal end 110, the mobile station 120 sends a call origination message to the base station 130 to set up the call in step s10. When the mobile station sends a service request message to the base station to set the service option N (or the multiplex option M) in step s20, the base station arranges the channel resources for the service option N and then sends a "service connect message" to the mobile station in step s30. The mobile station then starts processing the primary traffic according to the service option N (or the multiplex option M) and transmits a "service connect completion message" to the base station in step s40, thus completing the service negotiation process.

After the completion of the service negotiation process, the radio link protocol (RLP) layer is activated to make a transition to an active state where the data transmission is feasible, and the forward and the reverse fundamental code channels are used as traffic channels for the call setup and the service negotiation mode. When the quantity of the data to be transmitted to the base station is so large that it is not possible to transmit the data using only the fundamental code channel, the mobile station sends a "supplemental code channel assignment request" to the base station in step s120 of FIG. 8. To this end, the mobile station sends the base station the "supplemental channel request message," which includes the number (NUM_SUPMS) and the hold duration (REV_DUR) of the supplemental code channels to be assigned to the base station via the fundamental code channel. The mobile station determines the number (NUM_SUPMS) and the hold duration (REV_DUR) of the supplemental code channels based on the quantity of the transmission data, the frame error rate on a radio interface, the retransmission rate on the radio link protocol (RLP), the error rate on a point-to-point protocol (PPP) or the transmission control protocol/Internet protocol (TCP/IP) defined by the TIA/EIA/IS-95B.

Upon the receipt of the "supplemental code channel assignment request" from the mobile station, the base station controller provides, in step s130, the SCAP of the base station with the NUM_SUPMS and the REV_DUR included in the received "supplemental code channel request message," to request the assignment of the supplemental code channels. In step s140, the SCAP assigns a plurality of supplemental channels between the mobile station and the base station based on the NUM_SUPMS, REV_DUR and the available channel resources, then provides the base station controller with the number of assigned supplemental code channels (ASS_SUP). In steps s150 to s154, the base station controller determines the number (NUM_SUP) and the hold duration (DUR) of the supplemental code channels to be actually used based on the NUM_SUPMS and REV_DUR requested by the mobile station and the ASS_SUP reported by the SCAP. In step s150, the base station controller compares the NUM_SUPMS with the ASS_SUP. The SCAP sets the ASS_SUP so that the NUM_SUPMS should not be smaller than the ASS_SUP, by consulting the supplemental code channel number NUM_SUPMS requested by the mobile station. Therefore, if the NUM_SUPMS is less than the ASS_SUP, the two values shall equal each other.

If the supplemental channel request message (NUM_SUPMS) by the mobile station is less than the assigned supplemental code channels (ASS_SUP) by the base station, the base station controller sets the number of supplemental code channels (NUM_SUP) to the NUM_SUPMS requested by the mobile station and sets the hold duration (DUR) to the REV_DUR requested by the mobile station, in step s152. Otherwise, if the NUM_SUPMS is larger than the ASS_SUP, the base station controller sets the NUM_SUP to the ASS_SUP and the DUR to a value calculated by Equation (1) below, in step s154.

$$DUR = (REV\_DUR \times NUM\_SUPMS)/ASS\_SUP \qquad (1)$$

That is, when the supplemental code channel assignment processor (SCAP) can not assign the supplemental code channels as many as the number of supplemental code channels message (NUM_SUPMS) requested by the mobile station, the base station controller increases the hold duration (DUR) of the supplemental code channel to be enough to transmit the entire data. The base station controller sets the number of supplemental code channels (NUM_SUP) and the duration (DUR) of the supplemental code channels required for the assignment of the multi-channel, in steps s150 to s154 (see of FIG. 9). Thereafter, in step s160 of FIG. 8, the base station controller transmits a "supplemental channel assignment message" to the mobile station which includes the determined the NUM_SUP and the DUR. Upon the receipt of the "supplemental channel assignment message," the mobile station and the base station operate the supplemental code channels as many as the determined NUM_SUP, in step s170. That is, upon the receipt of the supplemental channel message in step s60 of FIG. 9, the mobile station transitions from the "multi-channel action time waiting state" 420 to the "multi-channel operation state" 430 to exchange the data with the base station over a plurality of the supplemental code channels (see 40 of FIG. 9).

The base station can selectively stop the operation of the supplemental code channels when the channel has an error. In this case, the base station transmits the "supplemental channel assignment message" to stop the operation of the multi-channel to the mobile station in step s70, and the mobile station then stops the operation of the multi-channel (see 50). When the channel is restored to the normal condition, the base station sends the mobile station the "supplemental code channel assignment message" to restart the operation of the multi-channel in step s80, then the mobile station restarts the operation of the multi-channel (See number 60 in FIG. 9). For the assignment of the supplemental code channels, the "supplemental channel request message" and the "supplemental channel assignment message" are transmitted between the base station and the mobile station over the fundamental code channel. When the mobile station and the base station exchange the packet data, the constant assignment of the supplemental code channel will create the resource waste. Therefore, the mobile station and the base station limit the operation time of the supplemental code channel based on the duration value DUR. After the assignment of the supplemental code channel, when the duration DUR determined by the base station controller expires, the base station and the mobile station stop using the supplemental code channels (70) and then release all assigned supplemental code channels.

B. Second Embodiment

In the second embodiment of the present invention, the base station controller requests the assignment of the supplemental code channels after the call setup.

Figure 10:
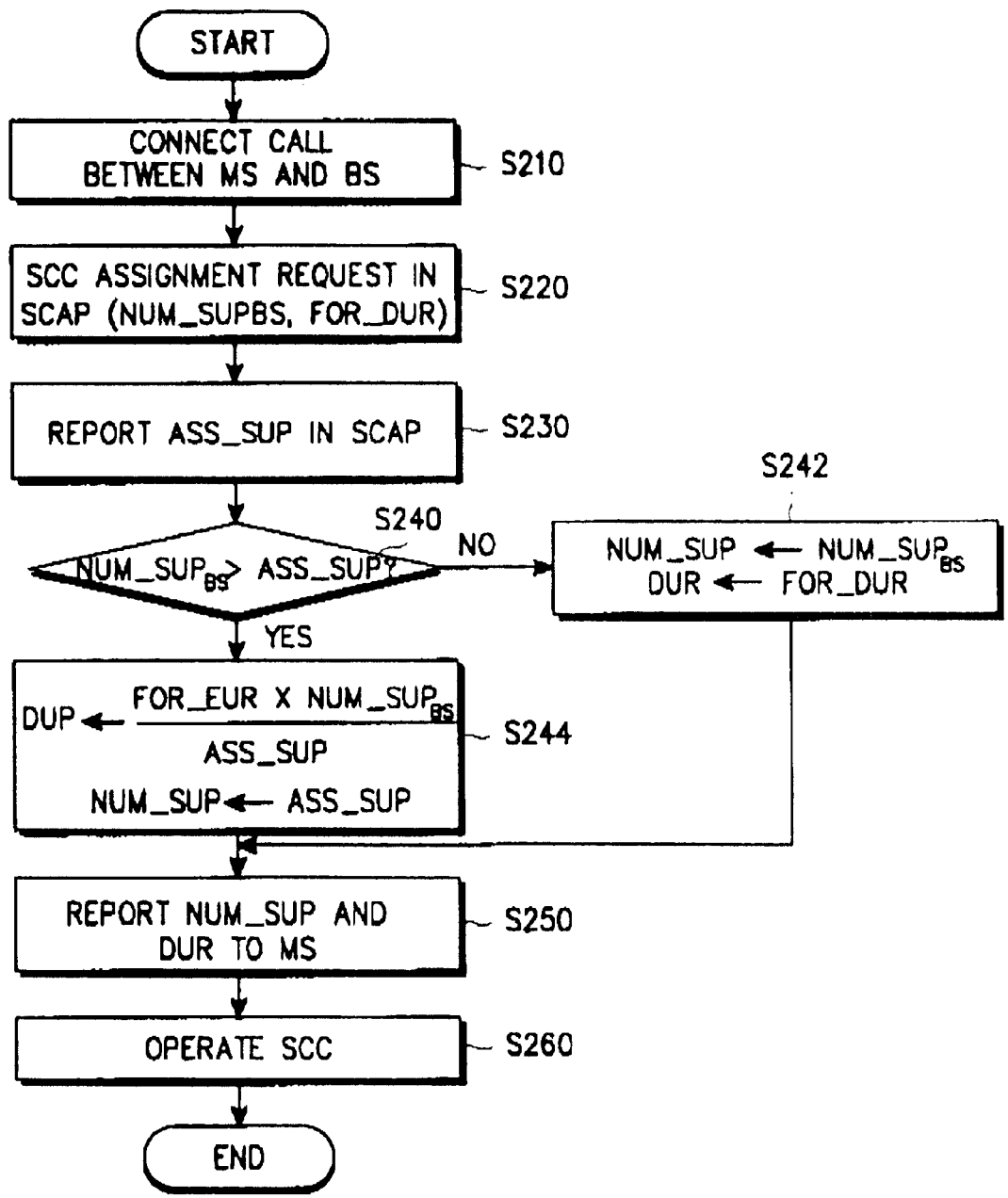
FIG. 10 is a flow chart illustrating a method for operating the supplemental code channels according to the second embodiment of the present invention.

FIG. 10 illustrates the method for operating the supplemental code channels according to the second embodiment of the present invention. As illustrated, the mobile station and the base station connect a call, in step s210, and the base station controller sends a "supplemental code channel (SCC) assignment request" to the supplemental code channel assignment processor (SCAP) of the base station in step s220. The SCAP reports the supplemental code channel assignment results to the base station controller in step s230. The base station controller determines the number of the supplemental code channels (NUM_SUP) to be assigned and the duration of the corresponding supplemental code channels (DUR) based on the supplemental code channel assignment results, in steps s240, s242, and s244. The base station controller reports the determined supplemental code channel number and the duration (DUR) to the base station and the mobile station, in step s250. The base station and the mobile station operate the supplemental code channels based on the reported supplemental code channel number and the duration in step s260. A detailed description of this procedure will be made below.

Referring to FIG. 10, in step s210, the mobile station and the base station connect a call through the call setup process and the service negotiation process. When the quantity of the data to be transmitted from the system to the mobile station is so large that the data cannot be transmitted only with the fundamental code channel, the base station controller sends a "supplemental code channel assignment request" to the base station in step s220. To request the assignment of the supplemental code channels, the base station controller transmits the number of supplemental code channels (NUM_SUPBS) to be assigned and the duration of the corresponding supplemental code channels (FOR_DUR) to the SCAP. At this point, the base station controller determines the NUM_SUPBS and the duration (FOR_DUR) of the supplemental code channels based on the quantity of the transmission data, the frame error rate on the radio interface, the re-transmission rate on the radio link protocol, the error rate on the point-to-point protocol, and the TCP/IP.

In step s230, the SCAP assigns the supplemental code channels between the mobile station and the base station based on the number (NUM_SUPBS) and the duration (FOR_DUR) of the supplemental code channels, and the availability of the base station channel resources, then reports the assigned supplemental code channels (ASS_SUP) to the base station controller. In steps s240 to s244, the base station controller determines the number (NUM_SUP) and the duration (DUR) of the supplemental code channels to be actually used based on the NUM_SUPBS, the FOR_DUR, and the ASS_SUP reported by the SCAP. The base station controller compares the NUM_SUPBS with the ASS_SUP in step s240. When the NUM_SUPBS is less than the ASS_SUP, the base station controller sets the NUM_SUP to the NUM_SUPBS, and sets the DUR to the FOR_DUR, in step s242. Otherwise, if the NUM_SUPBS is larger than the ASS_SUP, the base station controller sets the NUM_SUP to the ASS_SUP, and sets the DUR to a value calculated by Equation (2) below, in step s244.

$$DUR=(FOR\_DUR \times NUM\_SUPBS)/ASS\_SUP \qquad (2)$$

After determining the number (NUM_SUP) and the duration (DUR) of supplemental code channels required for the assignment of the multi-channel in steps s240 to s244, the base station controller reports the determined NUM_SUP and the DUR to the mobile station in step s250. Thereafter, in step s260, the mobile station and the base station assign the supplemental code channels as many as the determined number NUM_SUP, and exchange the data by operating the assigned supplemental code channels. Meanwhile, upon the expiration of the duration (DUR) determined by the base station controller, the base station and the mobile station stop using the supplemental code channels and release all assigned supplemental code channels.

C. Third Embodiment

In the third embodiment of the present invention, a new base station is added due to a hand-off after the assignment of the supplemental code channels.

Figure 11:
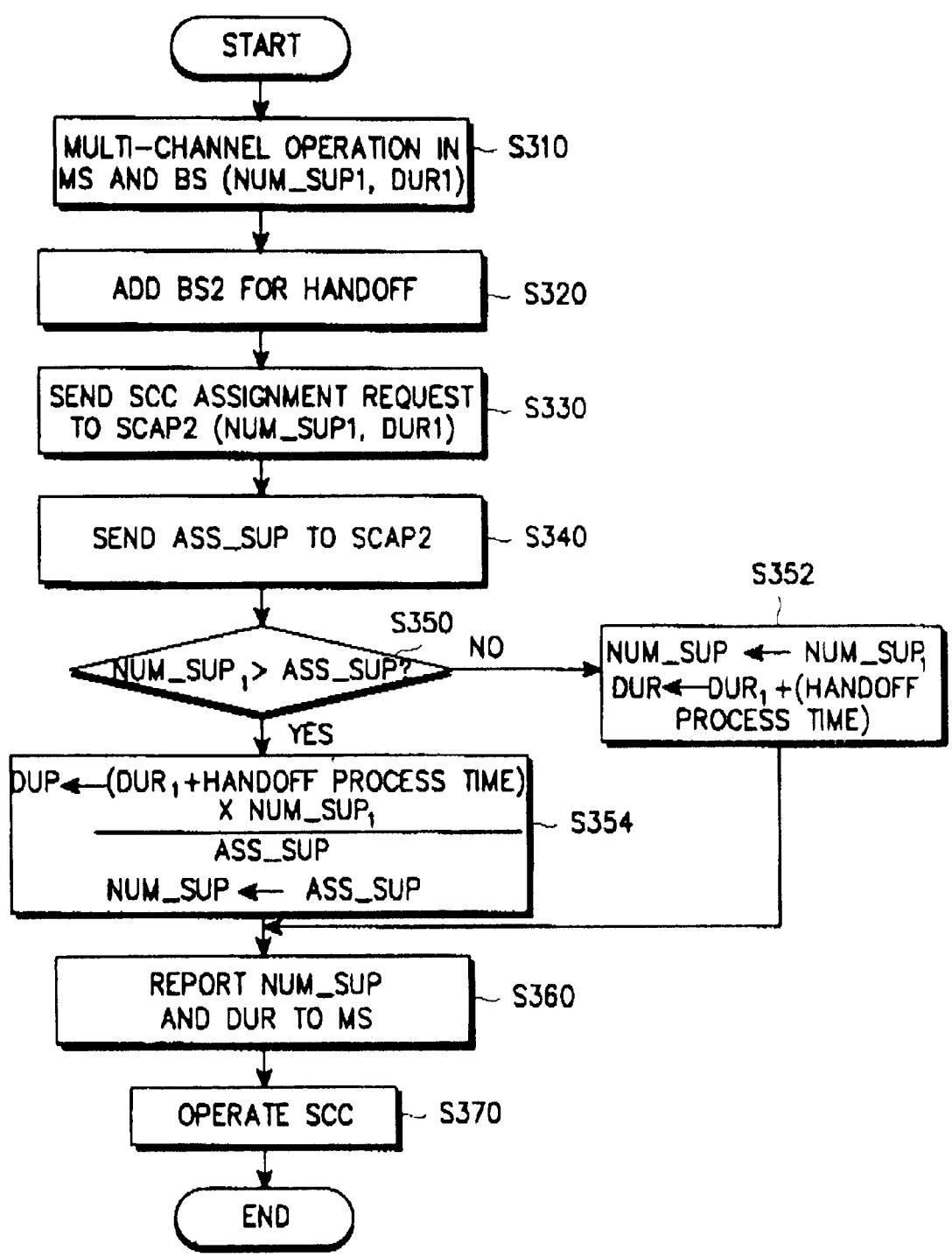
FIG. 11 is a flow chart illustrating a method for operating the supplemental code channels according to the third embodiment of the present invention; and, FIG. 12 is a flow chart illustrating a method for operating the supplemental code channels according to the fourth embodiment of the present invention.

FIG. 11 shows the method for operating the supplemental code channels according to the third embodiment of the present invention. As illustrated, the mobile station and a first base station connect a call and operate a multi-channel in step s310, and then a second base station is added during the hand-off to the mobile station in step s320. The base station controller sends a "supplemental code channel (SCC) assignment request" to the supplemental code channel assignment processor (SCAP) of the second base station in step s330. The SCAP reports the supplemental code channel assignment results to the base station controller in step s340. The base station controller determines the number (NUM_SUP) of the supplemental code channels to be assigned and the duration (DUR) of the corresponding supplemental code channels based on the supplemental code channel assignment results, in steps s350, s352 and s354. The base station controller reports the determined SCC number and the duration (DUR) to the first base station, the second base station, and the mobile station, in step s360. The first and the second base stations and the mobile station operate the number of supplemental code channels corresponding the reported supplemental code channel number for the determined duration (DUR) in step s370. The detailed description of this procedure will be made below.

It will be assumed that the NUM_SUP1 of supplemental code channels are assigned between the mobile station and the first base station, and that the hold duration of the supplemental code channels is DUR1. When the mobile station enters the boundary of the first and the second base stations or when the base station receives signals from both the first and the second base stations, the mobile station establishes the communication channel to the second base station through a hand-off process.

In particular, when the mobile station connects the channel to both the first and the second base stations through a soft handoff, the base station controller enables the mobile station to connect a plurality of the supplemental code channels to the first and the second base stations through a separate control.

Referring to FIG. 11, in step s310, the mobile station and the first base station operate a plurality of supplemental code channels. That is, the number (NUM_SUP1) of supplemental code channels is assigned between the mobile station and the first base station, and the hold duration of the supplemental code channels is set to DUR1. When the second base station is added upon the occurrence of a handoff in step s320, the base station controller sends a "supplemental code channel assignment request" to a SCAP2 of the second base station in step s330. To request the assignment of the supplemental code channels, the base station controller transmits the number (NUM_SUP1) of the supplemental code channels presently in use and the hold duration DUR1 of the corresponding supplemental code channels to the SCAP2.

In step s340, the SCAP2 assigns the number of supplemental code channels (ASS_SUP) between the mobile station and the second base station based on the number (NUM_SUP1) and the hold duration (DUR1) of the supplemental code channels and the availability of the base station channel resources, then reports the number (ASS_SUP) of the assigned supplemental code channels to the base station controller. In steps s350 to s354, the base station controller determines the number (NUM_SUP) and the hold duration (DUR) of the supplemental code channels to be actually used based on the NUM_SUP1, the DUR1 and the ASS_SUP reported by the SCAP2. At this point, the hold duration is determined by considering the time (i.e., a handoff process time) required for calculating the number and the hold duration of the supplemental code channels due to the occurrence of a handoff in step s320.

The base station controller compares the NUM_SUP1 with the ASS_SUP in step s350. When the NUM_SUP1 is less than the ASS_SUP, the base station controller sets the NUM_SUP to the NUM_SUP1, and sets the DUR to a (DUR+(handoff process time)), in step s352. Otherwise, when the NUM_SUP1 is larger than the ASS_SUP, the base station controller sets the NUM_SUP to the ASS_SUP, and sets the DUR to a value calculated by Equation (3) below, in step s354.

$$DUR=(DUR1+(\text{handoff process time}) \times NUM\_SUP1)/ASS\_SUP \quad (3)$$

After determining the number (NUM_SUP) and hold duration (DUR) of the supplemental code channels required for the assignment of the multi-channel in steps s350 to s354, the base station controller reports the determined NUM_SUP and the DUR to the first and second base stations and the mobile station in step s360. Thereafter, in step s370, the mobile station and the first and second base stations assign the supplemental code channels as many as the determined NUM_SUP and exchange the data through the assigned supplemental code channels. Moreover, upon the expiration of the hold duration DUR determined by the base station controller, the first base station, the second base stations, and the mobile station stop using the supplemental code channels and release all assigned supplemental code channels.

D. Fourth Embodiment

In the fourth embodiment of the present invention, a "supplemental code channel assignment request" is received from a base station or a mobile station while the handoff is performed.

Figure 12:
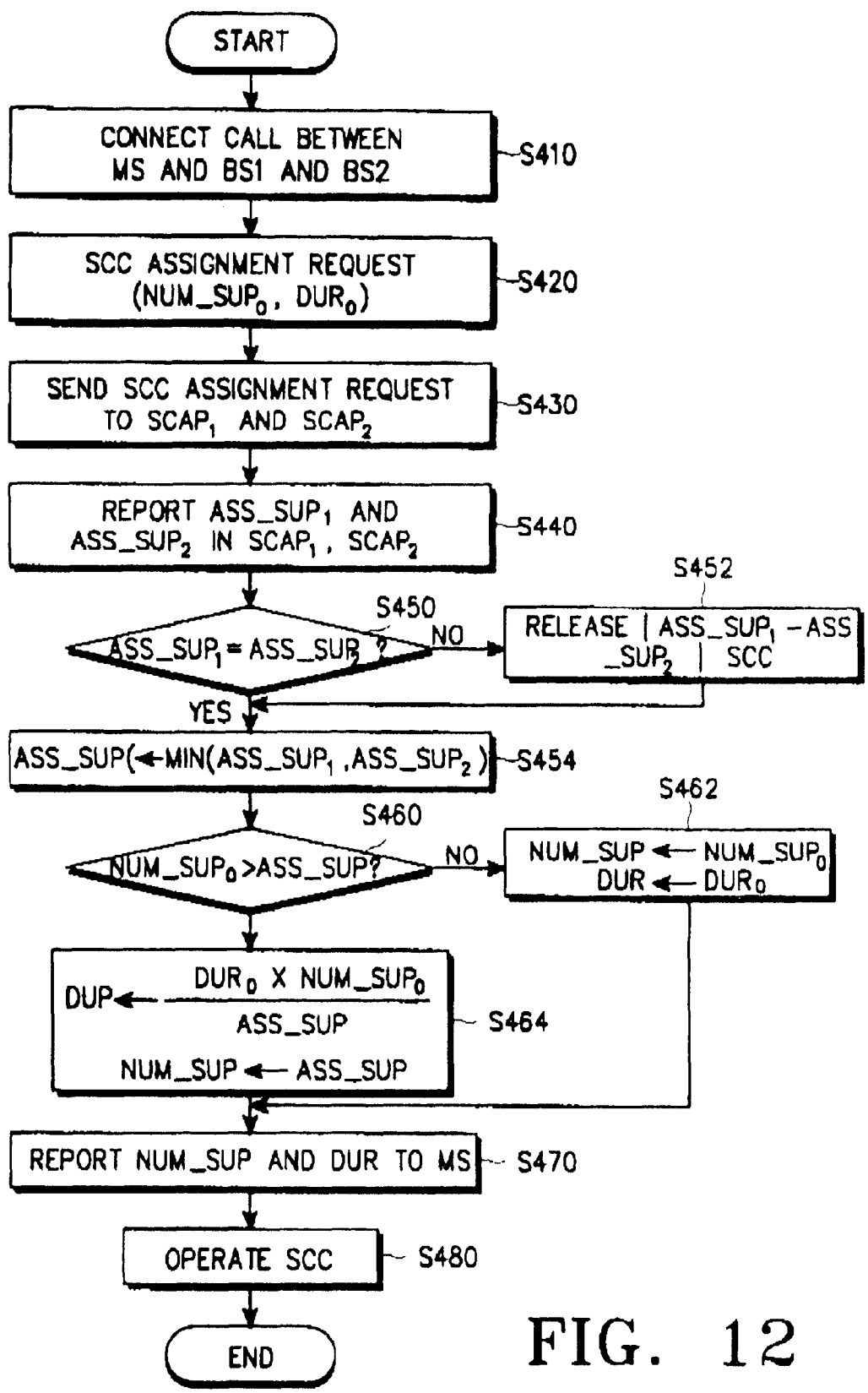

FIG. 12 shows the method for operating the supplemental code channels according to the fourth embodiment of the present invention. As illustrated, the mobile station connects the first and second base stations through the hand-off process in step s410, and the mobile station and the base station controller request the assignment of the supplemental code channels in step s420. The base station controller sends a "supplemental code channel (SCC) assignment request" to the SCAP1 and the SCAP2 of the first and second base stations, respectively, in step s430. The SCAP1 and SCAP2 report the supplemental code channel assignment results to the base station controller, in step s440. The base station controller determines the number of the supplemental code channels to be assigned and the hold duration of the corresponding supplemental code channels based on the supplemental code channel assignment results, in steps s450, s452, s454, s460, s262, and s464. The base station controller reports the determined supplemental code channel number and the hold duration to the first and second base stations and the mobile station, in step s470. The first and second base stations and the mobile station operate the number of supplemental code channels based on the reported supplemental code channel number and the hold duration in step s480. A detailed description of this procedure will be made below.

When a mobile station is located at an area where it can receive signals from both the first and the second base stations and controlled by the same base station controller, the mobile station connects the channels to both the first and the second base stations through a soft handoff. Thus, the mobile station is provided with the data service through the two base stations.

Referring to FIG. 12, in step s410, the mobile station maintains the channel communication to the first and second base stations by the hand-off process. When the mobile station has a large amount of data to transmit to the two base stations or when the base station controller has a large data to transmit to the mobile station through the two base stations, the mobile station and the base station controller require the operation of a multi-channel in step s420. The mobile station and the base station controller determine the number (NUM_SUP0) and the hold duration (DUR0) of the supplemental code channels based on the quantity of the transmission data, the frame error rate on a radio interface, the re-transmission rate on the radio link protocol, and the error rate of the point-to-point protocol and TCP/IP defined by TIA/EIA/IS-95B standard. The base station controller sends a "supplemental code channel assignment request" to SCAP1 and SCAP2 of the first and the second base stations, in step s430. To request the assignment of the supplemental code channels, the mobile station or the base station controller transmits the number (NUM_SUP0) of the supplemental code channels presently in use and the hold duration (DUR0) of the corresponding supplemental code channels to the SCAP1 and the SCAP2.

In step s440, the SCAP1 and the SCAP2 assign the respective supplemental code channels (ASS_SUP1 and ASS_SUP2) based on the number (NUM_SUP0) and the hold duration (DUR0) of the supplemental code channels and the availability of the base station channel resources, then reports the NUM_SUP0, the ASS_SUP1, and the ASS_SUP2 of the assigned supplemental code channels to the base station controller. In steps s450 to s454, the base station controller determines the number (NUM_SUP) and the hold duration (DUR) of the supplemental code channels to be actually used based on the NUM_SUP0, the DUR0, and the ASS_SUP1 and the ASS_SUP2 reported by the SCAP1 and the SCAP2, respectively.

The base station controller compares the ASS_SUP1 with the ASS_SUP2 in step s450. When the ASS_SUP1 is not equal to the ASS_SUP2, the base station controller request the SCAP with the higher ASS_SUP to release the supplemental code channels as many as a difference between the ASS_SUP1 and the ASS_SUP2, in step s452. For example, if the SCAP2 has reported the higher ASS_SUP compared to the SCAP1, the base station controller requests the SCAP2 to release the (ASS_SUP2-ASS_SUP1) supplemental code channels. When the SCAP2 releases the (ASS_SUP2-ASS_SUP1) supplemental code channels, the number of supplemental code channels assigned by the SCAP1 becomes equal to the number of the supplemental code channels assigned by the SCAP2. Thereafter, the base station controller sets the ASS_SUP to one of ASS_SUP1 and ASS_SUP2 which has the lower value, in step s454.

Thereafter, the base station controller compares the NUM_SUP0 with the ASS_SUP in step s460. If the NUM_SUP0 is less than the ASS_SUP, the base station controller sets the NUM_SUP to the NUM_SUP0, and sets the DUR to the DUR0 in step s462. Otherwise, if the NUM_SUP0 is larger than the ASS_SUP, the base station controller sets the NUM_SUP to the ASS_SUP, and sets the DUR to a value determined by Equation (4) below, in step s464.

$$DUR=(DUR0 \times NUM\_SUP0)/ASS\_SUP \qquad (4)$$

After determining the number (NUM_SUP) and the hold duration (DUR) of the supplemental code channels required for the assignment of multi-channel in steps s450 to s464, the base station controller reports the determined NUM_SUP and the DUR to the first and second base stations and the mobile station, in step s470. Thereafter, in step s480, the mobile station and the first and second base stations assign the supplemental code channels as many as the determined number NUM_SUP and exchange the data through the assigned supplemental code channels. Moreover, upon the expiration of the hold duration DUR determined by the base station controller, the first and second base stations and the mobile station stop using the supplemental code channels and release all assigned supplemental code channels.

As described above, the novel method assigns a plurality of code channels to a radio link between the base station and the mobile station and controls the assigned code channels on a multi-channel control basis, thereby providing a high-speed data service to the mobile station.

While the invention has been shown and described with reference to a certain preferred embodiment thereof, it will be understood by those skilled in the art that various changes in form and detail may be made therein without departing from the spirit and the scope of the invention as defined by the appended claims.

What is claimed is:

1. A method for employing a plurality of supplemental code channels (SCC) for a high-speed data transmission in a radio telecommunication system, comprising the steps of:
   (a) establishing a call connection between a mobile station (MS) and a base station(BS);
   (b) transmitting a request with a predetermined number of said SCC and a predetermined hold duration of said SCC by said mobile station to a base station controller (BSC) via said base station for the data transmission via said predetermined SCC;
   (c) upon receiving said first request, transmitting, by said base station controller (BSC), said request to an assignment processor (SCAP) of said base station (BS);
   (d) upon receiving said request, assigning a new number of said SCC by said SCAP of said base station (BS) for communicating with said mobile station and reporting said assignment of said new SCC number to said base station controller;
   (e) determining a final number of said SCC and a final hold duration of said SCC by said base station controller based on said assignment report;
   (f) reporting, by said base station controller, said final SCC number and said final hold duration to said base station and said mobile station; and,
   (g) allocating the number of said SCC for the data transmission between said base station and said mobile station based on said final SCC number and said final hold duration.

2. The method as claimed in claim 1, wherein said step (a) of establishing said call connection comprises the steps of:
   sending, by said mobile station, a call origination request to said base station through a fundamental code channel to establish said call connection; and,
   performing a service negotiation process between said base station and said mobile station through said fundamental code channel to employ said plurality of SCC for said data transmission.

3. The method as claimed in claim 2, wherein said service negotiation process comprises the step of sending said first request to said base station controller through said base station in response to a determination that the data transmission from said mobile station to said base station is not possible through said fundamental code channel.

4. The method as claimed in claim 3, wherein said predetermined number of said SCC and said predetermined number of said hold duration of said SCC are determined by said mobile station based on a determination of the quantity of the data transmission, a frame error rate (FER) on a radio interface, a re-transmission rate on a radio link protocol (RLP), and an error rate on point-to-point protocol, and a Transmission Control Protocol/Internet Protocol (TCP/IP) as set forth under a TIA/EIA/IS-95B standard.

5. The method as claimed in claim 4, wherein said step (d) of assigning said new SCC number by said SCAP of said base station is based on a determination of said predetermined number of said SCC, said predetermined hold duration, and an availability of channel resources of said base station.

6. The method as claimed in claim 5, wherein said step (e) of assigning said final SCC number comprises the step setting said final SCC number to said predetermined SCC number by said mobile station and setting said final hold duration to said predetermined hold duration, if the value of said predetermined SCC number is less than said new SCC number.

7. The method as claimed in claim 6, wherein said step(e) of determining said final number and said final hold duration of said SCC comprises the steps of:

comparing said predetermined SCC number with said new SCC number assigned by said SCAP of said base station;

setting said final SCC number to said new SCC number, if the value of said predetermined SCC number is greater than said new SCC number; and, setting said hold duration to a value determined by multiplying said predetermined hold duration with said predetermined SCC number and dividing said multiplication output by said new SCC number, if the value of said predetermined SCC number is greater than said new SCC number.

8. The method as claimed in claim 7, wherein said step(g) of allocating said new SCC number comprises the steps of:

assigning said final SCC number between said base station and said mobile station and exchanging the data transmission over said allocated SCC and said fundamental code channels; and, releasing said allocated SCC after the expiration of said final hold duration.

9. The method as claimed in claim 8, wherein said step of releasing said allocated SCC further comprises the steps of:

transmitting a command signal to stop the data transmission between said base station and said mobile station via said allocated SCC; and, upon receiving said command signal, temporally stopping the data transmission via said allocated SCC by said mobile station.

10. The method as claimed in claim 8, wherein said step of releasing said allocated SCC further comprises the steps of:

transmitting a command signal to said mobile station by said base station to stop the data transmission between said base station and said mobile station via said allocated SCC;

upon receiving said command signal, temporally stopping the data transmission via said allocated SCC and said mobile station; and, ordering said mobile station by said base station to restart the data transmission between said base station and said mobile station via said allocated SCC.

11. A method for employing a plurality of supplemental code channels (SCC) for a high-speed data transmission in a radio telecommunication system, comprising the steps of:

(a) establishing a call connection between a mobile station (MS) and a base station(BS);

(b) transmitting a request with a predetermined number of said SCC and a predetermined hold duration of said SCC by said base station controller to an assignment processor (SCAP) of said base station (BS) for the data transmission via said predetermined SCC;

(c) upon receiving said request, assigning a new number of said SCC for communicating with said mobile station by said SCAP of said base station (BS) and reporting said assignment of said new SCC number to said base station controller;

(d) determining, by said base station controller, a final number of said SCC and a final hold duration of said SCC based on said assignment report;

(e) reporting, by said base station controller, said final SCC number and said final hold duration of said SCC to said base station and said mobile station; and, (f) allocating the number of said SCC for the data transmission between said base station and said mobile station based on said final SCC number and said final hold duration of said SCC.

12. The method as claimed in claim 11, wherein said predetermined number of said SCC and said predetermined number of said hold duration of said SCC are determined by said mobile station based on a determination of the quantity of the data transmission, a frame error rate (FER) on a radio interface, a re-transmission rate on a radio link protocol (RLP), and an error rate on point-to-point protocol, and a Transmission Control Protocol/Internet Protocol (TCP/IP) as set forth under a TIA/EIA/IS-95B standard.

13. The method as claimed in claim 12, wherein said step (c) of assigning said new SCC number by said SCAP is based on a determination of said predetermined number of said SCC, said predetermined hold duration, and an availability of channel resources of said base station.

14. The method as claimed in claim 13, wherein said step (d) of assigning said final SCC number comprises the step setting said final SCC number to said predetermined SCC number by said base station, if the value of said predetermined SCC number is less than said new SCC number.

15. The method as claimed in claim 14, wherein said step(d) of determining, said final SCC number and said final hold duration of said SCC comprises the steps of:

comparing said predetermined SCC number with said new SCC number assigned by said SCAP of said base station;

setting said final number of said SCC to said new number of said SCC, if the value of said predetermined SCC number is greater than said new SCC number; and, setting said hold duration equal to a value determined by multiplying said predetermined hold duration with said predetermined SCC number and dividing said multiplication output by said new SCC number, if the value of said predetermined SCC number is greater than said new SCC number.

16. The method as claimed in claim 15, wherein said step of allocating said new SCC number comprises the steps of:

assigning said final SCC number between said base station and said mobile station and exchanging the data transmission over said allocated SCC and said fundamental code channels; and, releasing said allocated SCC after the expiration of said final hold duration.

17. The method as claimed in claim 16, wherein said step of releasing said allocated SCC further comprises the steps of:

transmitting a command signal to said mobile station by said base station to stop the data transmission between said base station and said mobile station over said allocated SCC;

upon receiving said command signal, stopping temporally the data transmission via said allocated SCC said base station;

ordering said mobile station to restart the data transmission by said base station between said base station and said mobile station via said allocated SCC; and, upon receiving said order, restarting the data transmission by said mobile station via said allocated SCC.

18. A method for employing a plurality of supplemental code channels (SCC) for a high-speed data transmission in a radio telecommunication system, comprising the steps of:

(a) connecting a call between a mobile station and a first base station and communicating between said mobile station and said first base station through said plurality of supplemental code channel;

(b) adding a second base station through a hand-off process to said communication between said mobile station and said first base station;

(c) transmitting a request with a predetermined number of said SCC and a predetermined hold duration of said SCC by said base station controller to an assignment processor (SCAP) of said second base stations (BSs) for the data transmission via said predetermined SCC;

(d) upon receiving said request, assigning a new number of said SCC for communicating with said mobile station by said SCAP of said second base station (BS) and reporting said assignment of said new SCC number to said base station controller;

(e) determining a final number of said SCC and a final hold duration of said SCC by said base station controller based on said assignment report;

(f) reporting, by said base station controller, said final SCC number and said final hold duration to said first and said second base stations and said mobile station; and, (g) allocating the number of said SCC for the data transmission between said first and said second base stations and said mobile station based on said final SCC number and aid final hold duration of said SCC.

19. The method as claimed in claim 18, wherein said step (d) of assigning said new SCC number by said SCAP of said second base station is based on a determination of said predetermined SCC number, said predetermined hold duration, and an availability of channel resources of said second base station.

20. The method as claimed in claim 19, wherein said step (e) of assigning said final number of said SCC comprises the step setting said final number of said SCC to said predetermined SCC number, if the value of said predetermined SCC number is less than said new SCC number.

21. The method as claimed in claim 20, wherein said step(e) of determining said final number and said final hold duration of said SCC comprises the steps of:

comparing said predetermined SCC number with said new SCC number assigned by said SCAP of said second base station;

setting said final SCC number to said predetermined SCC number and setting said final hold duration to a combination of said predetermined final duration and said hand-off duration, if the value of said predetermined SCC number is less than said new SCC number, wherein said hand-off duration represents a duration period required to execute said hand-off process; and, setting said final SCC number to said new SCC number and setting said final hold duration to a value determined by multiplying said combination duration with said predetermined SCC number and dividing said multiplication output by said SCC number, if the value of said predetermined SCC number is greater than said new SCC number.

22. The method as claimed in claim 21, wherein said step of allocating said new SCC number comprises the steps of:

assigning said final SCC number between said first and second base stations and said mobile station and exchanging the data transmission over said allocated SCC and said fundamental code channels; and, releasing said allocated SCC after the expiration of said final hold duration.

23. A method for employing a plurality of supplemental code channels (SCC) for a high-speed data transmission in a radio telecommunication system, comprising the steps of:

(a) establishing a call connection between a mobile station and a first base station and a second base station;

(b) transmitting a request with a predetermined number of said SCC and a predetermined hold duration by said base station or said mobile station;

(c) transmitting said request, by a base station controller, to a first and a second assignment processor (SCAP) of said first base station and said second base station, respectively;

(d) upon receiving said request, assigning a respective new number of said SCC for the data transmission by said first and said second SCAPs of said first and second base station (BS)s and reporting said assignment of said respective new SCC number to said base station controller;

(e) determining, by said base station controller, a final number of said SCC and a final hold duration of said SCC based on said respective assignment reports;

(f) reporting, by said base station controller, said final SCC number and said final hold duration to said first and said second base stations and said mobile station; and, (g) allocating the number of said SCC for the data transmission between said mobile station and said first and said second base station based on said final SCC number and said final hold duration.

24. The method as claimed in claim 23, said step (d) of assigning said new SCC number by said first and said second SCAP of said respective first and second base stations is based on a determination of said predetermined SCC number, said predetermined hold duration, and an availability of channel resources of said first and said second base stations.

25. The method as claimed in claim 24, wherein said step (e) of assigning said final number of said SCC comprises the step setting said final SCC number to said predetermined SCC number, if the value of said predetermined SCC number is less than said respective new SCC number.

26. The method as claimed in claim 25, wherein said step of allocating said new number of said SCC comprises the steps of:

comparing said first new SCC number reported by said first SCAP with said second new SCC number reported by said second SCAP;

requesting one of said first and said second SCAPs having a higher said new SCC number to release a prescribed number of said SCC corresponding to a difference between said first new SCC number and said second new SCC number;

equalizing said first new SCC number and said second new SCC number to equal to each other by adding said released SCC number to one of said first SCAP and said second SCAP having a lower said new SCC number;

comparing said predetermined SCC number with said equalized new SCC number;

setting said final SCC number to said predetermined SCC number and setting said final hold duration to said predetermined hold duration if the value of said predetermined said prescribed SCC is less than said equalized new aid SCC number; and, setting said final SCC number to said new SCC number and setting said hold duration equal to a value determined by multiplying said predetermined hold duration with said predetermined SCC number and dividing said multiplication output by said new SCC number, if the value of said predetermined SCC number is greater than said equalized new SCC number.

27. The method as claimed in claim 26, wherein said step of allocating said new number of said SCC comprises the steps of:

assigning said final SCC number between said mobile station and said first and second base stations, respectively, and exchanging the data transmission over said allocated SCC; and, releasing said allocated SCC after the expiration of said final hold duration.

* * * * *